United States Patent [19]

Czerwiec

[11] Patent Number: 5,640,512
[45] Date of Patent: Jun. 17, 1997

[54] MAINTENANCE METHOD AND APPARATUS FOR PROVIDING A HIGH-INTEGRITY, UNIDIRECTIONAL, STANDARDIZED ATM/SONET/DS3 TRANSPORT SIGNAL LINK FOR A VIDEO DISTRIBUTION NETWORK

[75] Inventor: Richard M. Czerwiec, Raleigh, N.C.

[73] Assignee: Alcatel Network Systems, Inc., Richardson, Tex.

[21] Appl. No.: 528,325

[22] Filed: Sep. 14, 1995

[51] Int. Cl.$^6$ ................................................ H04B 10/08
[52] U.S. Cl. .................... 395/200.01; 370/241; 359/166
[58] Field of Search ................ 395/200.01; 379/29, 379/33; 359/110, 166; 370/490, 241

[56] References Cited

U.S. PATENT DOCUMENTS

| | | | |
|---|---|---|---|
| 4,654,890 | 3/1987 | Hasegawa et al. | 455/607 |
| 4,809,361 | 2/1989 | Okada et al. | 359/166 |
| 4,973,953 | 11/1990 | Shimokawa et al. | 340/825.05 |
| 5,321,691 | 6/1994 | Pashan | 370/58.3 |
| 5,367,395 | 11/1994 | Yajima et al. | 359/110 |
| 5,446,725 | 8/1995 | Ishiwatari | 370/16.1 |
| 5,473,665 | 12/1995 | Hall et al. | 379/29 |
| 5,524,113 | 6/1996 | Gaddis | 370/60.1 |
| 5,532,862 | 7/1996 | Tada et al. | 359/161 |
| 5,557,437 | 9/1996 | Sakai et al. | 359/110 |
| 5,564,021 | 10/1996 | Qui et al. | 395/200.12 |
| 5,594,576 | 1/1997 | Sutherland et al. | 359/118 |

*Primary Examiner*—William M. Treat
*Assistant Examiner*—Zarni Maung
*Attorney, Agent, or Firm*—Ware, Fressola, VanDer Sluys & Adolphson LLP

[57] ABSTRACT

A high-integrity video distribution signal is provided unidirectionally from one network node to another network node according to a standard digital communications format (ATM; SONET; DS3) that defines digital signal communications in a bidirectional manner with equal bandwidth in each direction. The one network node providing the video distribution signal simultaneously monitors the video distribution signal, e.g. by a modified loopback (in conjunction with optical power monitoring) for providing a performance monitoring function indicative only of performance of the one network node that provides the video distribution signal, wherein the another network node receiving the video distribution signal performs its own performance monitoring and communicates its performance in the network in a manner other than in the bidirectional manner defined in the standard, wherein the end result is providing the same level of performance monitoring and fault isolation that presently exists in a bidirectional system.

2 Claims, 5 Drawing Sheets

MAINTENANCE METHOD AND APPARATUS FOR PROVIDING A HIGH-INTEGRITY, UNIDIRECTIONAL, STANDARDIZED ATM/SONET/DS3 TRANSPORT SIGNAL LINK FOR A VIDEO DISTRIBUTION NETWORK

TECHNICAL FIELD

The present invention relates to maintenance functions for ensuring high integrity for a standard video distribution signal, such as an ATM/SONET/DS3 signal in a video distribution network and, more particularly, to a video distribution network with an architecture employing unidirectional transport links.

BACKGROUND OF THE INVENTION

Bellcore Technical Reference TR-NWT-001112, Issue 1, June 1993, entitled "Broadband ISDN User to Network Interface and Network Node Interface Physical Layer Generic Criteria", defines both the user-to-network interface and network node interface as bidirectional, as do similar ANSI/ITU standards. Similarly, ANSI T1.105-1991, entitled "Digital Hierarchy-Optical Interface Rates and formats Specifications (SONET)" assumes bidirectional links having equal bandwidth. Although ports defined according to these criteria are defined as bidirectional, the use of any such standard links such as asynchronous transport mode (ATM) for video distribution services can be significantly cost-reduced by means of unidirectional ports, since the bandwidth downstream is much greater than needed in the upstream direction. The cost reduction results from the savings of not having to provide an optical transmitter, i.e., laser, and receiver on each video link, as well as the savings of a fiber cable. The question, however, is how to monitor the quality of the video signal being distributed to downstream subscribers without the defined bidirectional monitoring scheme inherent in the DS3, SONET and ATM standards.

DISCLOSURE OF INVENTION

An object of the present invention is to provide performance monitoring and fault isolation for ensuring a high-integrity signal provided only from an upstream to a downstream unit.

According to the present invention, a video distribution signal is provided from one network node to another network node in a network according to a standard digital communications format that defines digital signal communications in a bidirectional manner with equal bandwidth in each direction, wherein the video distribution signal is provide unidirectionally from the one network node to the another network node without providing the digital signal communications in the defined bidirectional manner, and wherein the video distribution signal is monitored in the one network node that provides the video distribution signal for providing a performance monitoring function indicative only of performance of the one network node that provides the video distribution signal and wherein the another network performs its own performance monitoring and communicates its performance in the network other than in the defined bidirectional manner.

According to this procedure, signal integrity is guaranteed by means of the performance of loopback on the signal while transmitting the signal downstream at the same time. By so doing, the distribution unit performs performance monitoring on the loopback signal as if it were truly a received bidirectional signal, except that the distribution unit is inhibited from sending downstream fault recognition signals, since the faults recognized are not attributable to a non-existing received signal, but to a looped-back transmitted signal. Therefore, RDI and FEBE signals normally sent downstream are disabled, as they are meaningless to the downstream port. Any fault indications recognized in the distribution unit from the monitored looped-back signal are attributed to the distribution unit for fault isolation purposes. The downstream unit that receives the transmitted signal performs its own performance monitoring and communicates elsewhere in the network in some other manner, i.e., not according to the defined standard.

An added benefit of unidirectional operation is the rather simple implementation of providing automatic protection service on these links, e.g., using an additional fiber that may be present due to abandonment of bidirectional operation. This is rather straightforward in a one-plus-one protection scheme, as described below.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
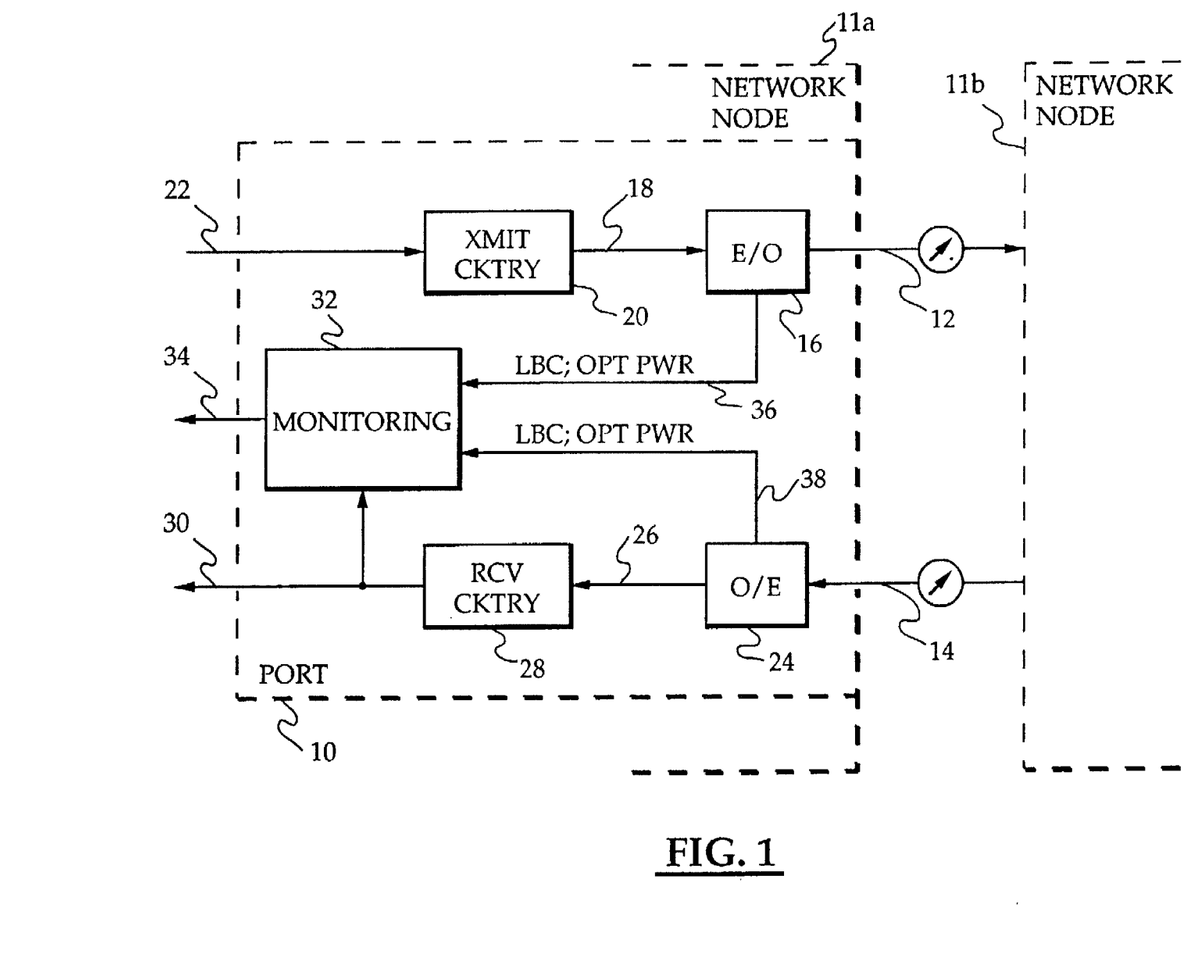
FIG. 1 shows a current bidirectional configuration for delivery of video services.

FIG. 1 shows a bidirectional port 10 resident in a network node 11a (not fully shown) for carrying out an interface function according to both ATM (asynchronous transfer mode) and SONET (synchronous optical network) standards which each assume bidirectionality of the signals interchanged between network nodes. The signals may be electrical or optical, but are in all cases assumed to be bidirectional and of equal bandwidth, which may be on a single wire or fiber or (more likely) on pairs of wires and fibers between nodes. FIG. 1 shows a pair of fibers 12, 14 for interconnecting the port 10 resident within the not-shown network node to another network node 11b (also not fully shown) in a network. An output signal is provided on the optical fiber 12 to the other network node 11b by an electrical-to-optical (E/O) converter 16, which is responsive to an electrical signal on a line 18 from transmit circuitry 20. The transmit circuitry is, in turn, responsive to an input electrical signal on a line 22 from within the network node 11a, within which the port 10 resides. The signal on the line 12 may but need not be a SONET OC-3c signal operating at 155.520 Mbit/s, which is a standard synchronous hierarchical rate defined in Section 6.2 of ANSI T1.105-1991. It should be realized, however, that the signal on the line 12 need not be optical, but could be electrical as well. Indeed, the signal on the line 12 need not be according to the SONET definition, but could be of some other standardized format, such as the well-known DS3 (digital signal level 3). Or, for example, super-rate mappings can be used, such as asynchronous mapping for a 139.264-Mbit/s signal into an STS-3c synchronous payload envelope (SPE), or ATM cells mapped into an STS-3c SPE, as described in Sections 12.3.1.1 and 12.3.1.2 of the above-mentioned ANSI T1.105-1991.

As also mentioned above, the standards assume not only the above-described transmission on lines 22, 18, 12 in one direction, but also a complementary signal path in the opposite direction from the other network node 11b on the line 14 to the network node 11a within which port 10 resides. It is provided to an optical-to-electrical converter 24 within the port 10, which in turn provides an electrical signal on a line 26 to receive circuitry 28 that provides an electrical output signal on a line 30 for further transmission to yet another not-shown node. As also mentioned, the standards assume comparable bandwidth in both of the bidirectional directions. In keeping with these assumptions, monitoring of the quality of the signal received on the line 12 is done by the node 11b that receives the signal on the line 12. After monitoring its quality, a status signal is sent back as a small part of the signal on the line 14 to the port 10 for use therein in identifying problems attributable to the port 10 itself or to the node 11b receiving the signal on the line 12. The port 10 can do this by monitoring the signal on the line 30, as shown, or the signal on the line 26, in the alternative. This sort of monitoring is well known and includes failure monitoring, such as loss of signal (LOS), loss of framing (LOF), loss of pointer (LOP) and bit interleaved parity (BIP) indicators. Similarly, maintenance functions such as path and line alarm indication status (AIS) and path and line remote defect indication (RDI) are performed in a monitoring block 32, monitoring the signal on the line 30. The monitoring block 32 can provide a status signal on a line 34 for use within the node 11a within which port 10 resides, or for transmission to yet another not-shown node in the network.

In addition to the above-mentioned failure and maintenance monitoring, for the optical interface shown, laser bias current (LBC) and optical power of a laser within each of the converters 16, 24 can be monitored, as indicated on lines 36, 38. In order to do this, each of the electrical/optical and optical/electrical interfaces 16, 24 can include transducers which provide signals indicative of the laser bias current and optical power output (or input on the receive path) for providing signal indications thereof on the lines 36, 38 to the monitoring block 32 for indicating the condition of the optical interfaces 16, 24.

Figure 2:
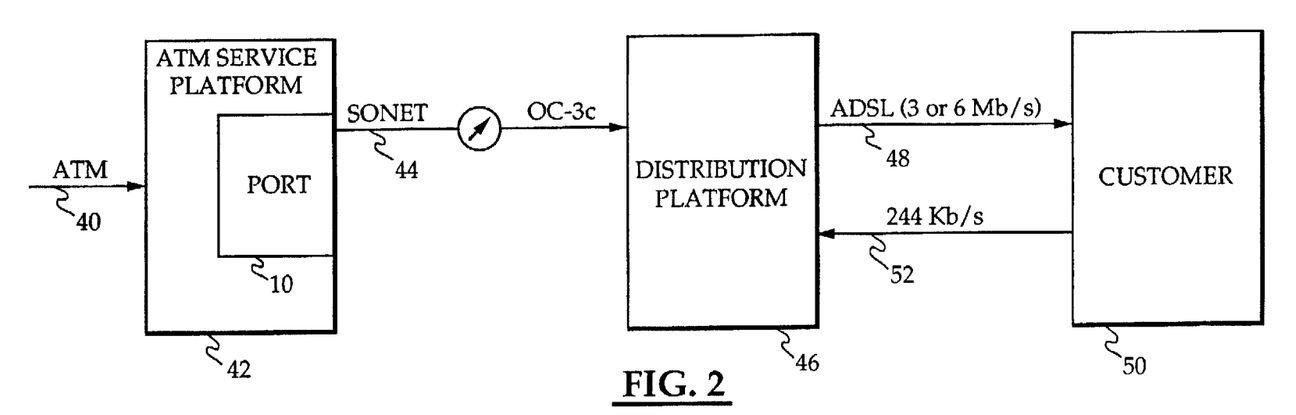
FIG. 2 shows an example of a video distribution system using a unidirectional approach.

This is all very well for a balanced bidirectional approach having equal bandwidth in both directions. However, as suggested in the Background of the Invention section, there is no need for equal bidirectional bandwidths in a video distribution system employing either ATM or SONET or both. This raises the possibility of providing a unidirectional video distribution system whereby a lesser number of electrical and/or optical links and associated interface ports may be needed. For instance, as shown in FIG. 2, ATM video packets provided on a line 40 to a node in a broadband switching system, such as an ATM virtual path service platform 42, with multiple ports such as the port 10 of FIG. 1, can be mapped according to the above-mentioned ANSI T1.105 specification into a SONET OC-3c signal as provided by the service platform 42 on a line 44 to a distribution platform 46 for providing video services on a line 48 to a customer 50. The downstream connection on the line 48 between the distribution platform 46 and the customer 50 may be an asymmetrical digital subscriber line (ADSL), defined as perhaps a one-way T-1 distribution to a customer's home or business over an existing twisted copper pair. It will be observed that there is no upstream optical fiber between the distribution platform 46 and the ATM service platform 42 to the port 10. This results in substantial savings in eliminating the optical interface in both the port 10 and in a similar port in the distribution platform 46, while also eliminating the need for any fiber in the upstream direction. This is especially true in the case where multiple distribution platforms 46 are to be connected to multiple ports 10 in the service platform 42. Any upstream bandwidth that may be required between the customer and upstream units, such as the distribution platform 46 and any other desired upstream units, may be carried by existing copper wires, such as a twisted pair 52 for carrying a 244 kb/s signal upstream from the customer to the distribution platform 46. From there, the intelligence may be provided to an operating system (OS) through the ATM service platform 42 (perhaps over a single bidirectional link in a grouping of many unidirectional fibers) or bypassing the service platform 42 and going by another path to the OS.

As suggested above, the problem with the video distribution system exemplified by FIG. 2 is that the defined ATM and SONET standards assume bidirectionality for equal bandwidth signals in each direction, with accompanying failure and maintenance functions carried out in a reciprocal manner, according to the underlying assumptions regarding bidirectionality and reciprocity. See, e.g., Section 4.9.4.1-3 of the above-referenced TR-NWT-001112.

Figure 3:
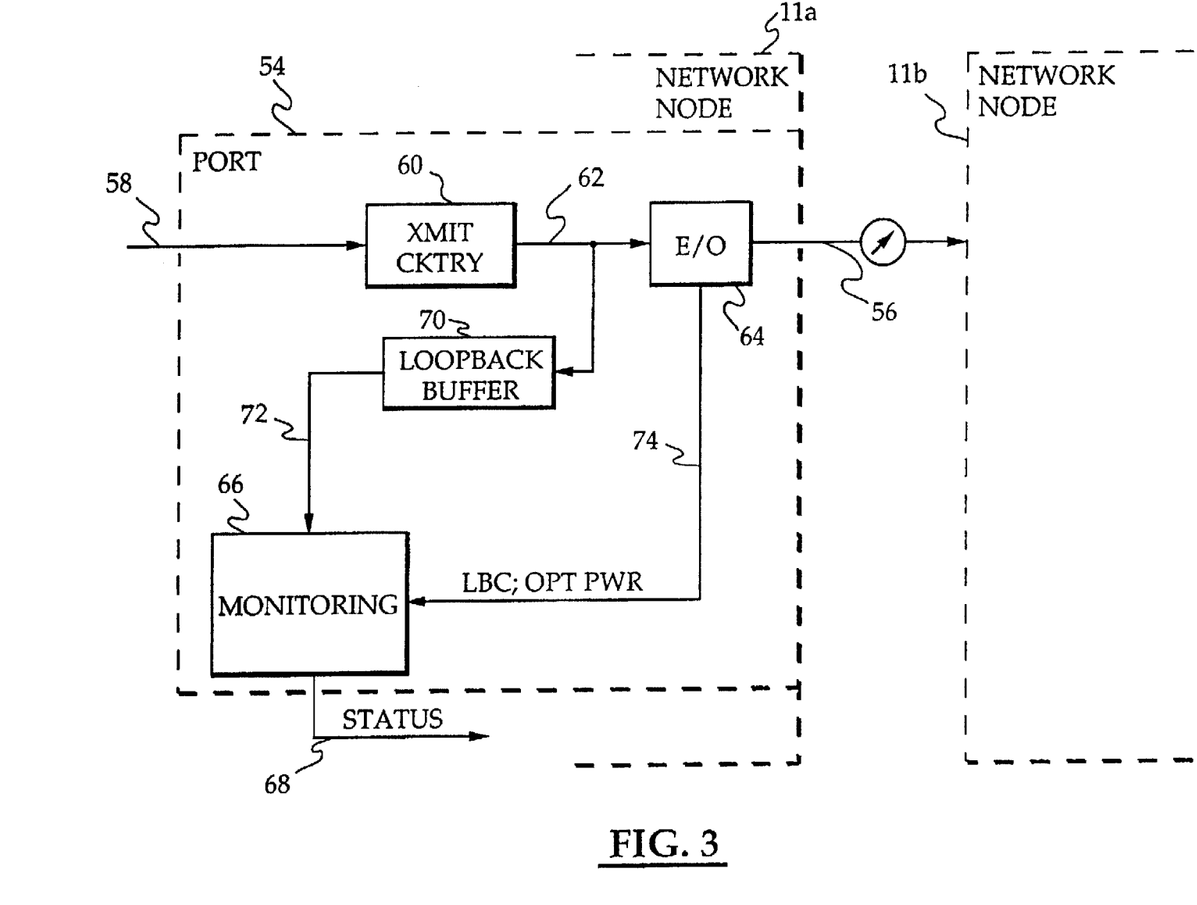
FIG. 3 shows performance monitoring, according to the present invention, of a transmit port.

FIG. 3 shows a unidirectional port 54, according to the present invention, for delivering broadband video services on a line 56 from an upstream source of video services, as represented by a signal line 58. As before, the port 54 may be located in a network node 11a that is responsive to an upstream source of a large number of video channels for delivery downstream for distribution to subscribers. The nature of the node is not important, as it may include many different varieties, including the ATM service platform shown in FIG. 2. The port 54 of FIG. 3 includes transmit circuitry 60 responsive to the signal on the line 58 for providing, e.g., frame generation, protocol processing and the like. It provides an electrical signal on a line 62 to an electrical-to-optical converter 64, which converts the electrical signal on the line 62 to the optical signal on the line 56. It should be realized, however, that the signal on the line 56 need not be optical, and in that case, the converter 64 would be absent and the port 54 would only include the transmit circuitry 60 and the monitoring functions to be described below. It should also be realized that although the port 54 is shown within a dashed line block, implying a self-contained unit such as a printed circuit board, the various blocks within the port 54 need not be associated together within any particular module or unit. They can be distributed on different hardware, firmware or software platforms while still carrying out the disclosed functions.

The port 54 includes a performance monitoring block 66 which monitors the signal on the line 62, just before it is converted to an optical signal. This can be done by any of a number of different ways, such as by modifying a loopback feature normally provided in such a port for diagnostic purposes. The normal loopback function opens the downstream circuit so that the downstream signal is replaced with an AIS indication, while the original signal is switched back to the upstream direction from which it came, to an adjacent network node where it can be evaluated in order to typically determine whether a reported fault is due to the node where the loopback is occurring or to an adjacent unit. Thus, the modification is to not break or replace the signal on the line 56 with AIS so that E/O conversion of the original signal can continue to take place and continue propagation downstream even while the loopback function is carried out simultaneously and at all times. In other words, the loopback function is modified to allow services on the line 56 to continue to be delivered to subscribers, while at the same time the signal on the line 62 is looped back to the monitoring function 66 for continual evaluation. The loopback function is further modified, in that the results of the monitoring function 66, which are indicated by a status signal on a line 68, are not provided to the any adjacent or upstream node, e.g., providing the video services on the line 58. Rather, the status signal on the line 68 is used internally within the node 11a within which the port 54 resides for determining whether or not the signal that it is providing on the line 56 to downstream units is in "good health". Instead of providing the signal on the line 62 directly to the monitoring block 66, a loopback buffer 70 may be used to store the signal on the line 62 for a brief period before being provided on a line 72 to the monitoring block 66.

In addition to monitoring the signal on the line 62, the laser bias current and optical output power of the laser in the converter 64 may also be monitored in the block 66, as indicated by the provision of signals indicative thereof on a line 74.

It should be mentioned that the converter 64 may include the function of converting the electrical signal to a defined standard signal for distribution, such as DS3, OC-3, OC-12, etc., in addition to the function of limited measurement performance monitoring of the laser bias current and optical power. It or the transmit circuitry can also be used to include the monitoring function 66 therewithin. It should also be mentioned that the status signal on the line 68 may instead or also be reported to the transmit circuitry 60. Furthermore, the loopback function shown in FIG. 3 can be performed by the converter 64 just prior to optical conversion, and can be carried out upon command from a craft terminal in the network node within which the port 54 resides. As mentioned, the prior art considers the loopback function strictly as a diagnostic tool, which generates a downstream AIS (alarm indication signal) when loopback is being performed. The above-mentioned changes to this operation are a key to performance monitoring on unidirectional video distribution links, according to the present invention.

In other words, signal integrity is guaranteed through the performance of the loopback on the signal on the line 62, while at the same time transmitting the signal downstream. By doing it this way, the port 54 is enabled to perform performance monitoring on the loopback signal, as if it were truly a received bidirectional signal, except that the monitoring block 66 is inhibited from sending downstream fault recognition signals, as any faults recognized are not attributable to a (non-existing) received signal, but to a looped-back transmitted signal. Therefore, RDI (remote defect indication) and FEBE (far-end block error) signals normally sent downstream must be disabled, as they are meaningless to the downstream "receive-only" port. Meanwhile, the performance monitoring fault indicators received on the looped-back signal at the block 66 are attributed to the transmit port, 60, 64 for fault isolation purposes both in node 11a, and in the network. Assuming performance monitoring does not flag errored operation on the looped-back transmit port, and the laser bias current (LBC) and optical power (OPT) signals show proper operation, the port is assumed to be of high integrity.

Performance monitoring on the looped-back signal includes the full range performed on a received signal in the prior art, including LOS (loss of signal), LOF (loss of frame), LOP (loss of pointer), LCD (loss of cell delineation), ES (errored seconds), SES (severely errored seconds), etc. Thus, the loopback is a full-stream loopback of the transmitted data, so that full performance monitoring can be accomplished on the transmit port, e.g., using the SONET overhead and ATM HEC (header error control) check monitoring capabilities defined by the above-mentioned standards, thereby isolating faults to section, line, path or ATM levels.

If it is desired to provide the flexibility to make the port either uni- or bidirectional, the port can be provided with software modifications to allow designation of a port as "transmit only", thereby allowing faults to be recognized as transmit port 54 degradations, as described above, rather than faults being received from a connecting network node 11b. These software modifications would not be significant, inasmuch as much of the normal loopback functionality would be utilized. Although the loopback function may or need not reach all the way out to the optical interface, the optical transmit interface may nevertheless be monitored constantly by laser bias current and optical transmit power threshold circuitry. If the port is provisionable from a craft interface, it can be selectable as bidirectional or unidirectional, giving flexibility. However, the real cost savings would occur in providing specific unidirectional ports, saving the cost of lasers and fiber in the receive direction.

Full bitstream loopback allows the performance monitoring circuitry 66 TU to count transmit port coding violations to determine ES, SES, UAS (unavailable second), etc., while also monitoring for LOS, LOF, LOP, LCD, etc. Specifically, for SONET section overhead, the framing bytes (A1/A2) are monitored for LOF, the B1 byte is monitored for coding violations (BIP errors calculated over the entire STS-3c frame) and the C1 byte may be monitored for STS identification. Coding violations (BIP errors) are accumulated by the circuit 66 to determine errored seconds (ES), severely errored seconds (SES) and unavailable seconds (UAS), with provisionable thresholds initiating maintenance actions initiated by the status signal on the line 68. The Z1 byte is also monitored on NNI connections to verify sync state.

During loopback at the line level, the H1/H2 bytes are monitored for LOP or path AIS indications, the B2 bytes are monitored for corrupted line overhead and payload (coding violations), and bits 6 through 8 of byte K2 are monitored for line AIS. Again, the B2 violations are accumulated in PM registers in terms of ES, SES and UAS as defined in Bellcore Technical Reference TR-NWT000253, Issue 2, December 1991 (Synchronous Optical Network (SONET) Transport Systems: Common Generic Criteria), with exceeded thresholds initiating maintenance activities specific to the failed port. Since loopback operation according to the present invention removes the remote end for reporting purposes, RDI-P indications in bits 6–8 of byte K2 will not be generated, nor the FEBE indications of the Z2 byte. If RDI or FEBEs are recognized in the looped-back monitored signal, an indication of errored operation is provided on the status line. This is true unless the XMIT port is provisional to generate RDI/FEBE, due to the downstream node ignoring this information. If so provisioned, monitoring RDI/FEBE of the looped-back signal is an extra level of performance monitoring.

During loopback at the path level, the path trace function (byte J1) can be monitored for proper operation, and the B3 and C2 bytes will be monitored for coding violations and signal label mismatch respectively. As above, coding violations are accumulated to determine ES, SES and UAS against the SONET payload envelope (SPE), with exceeded thresholds initiating maintenance actions specific to the failed port. The C2 bytes can be monitored for signal label mismatch (SLM) failures, if desired. Again, due to the absence of a remote end during loopback, the FEBE and RDI indications in the bits of byte G1 lack meaning and need not be monitored, and will not be generated.

At the ATM layer, the HEC generator mechanism and cell transmission integrity is checked via the cell delineation circuitry during loopback, with counts of errored cells evaluated against thresholds for initiation of maintenance actions. Loss of cell delineation will also be monitored and acted upon, and used for fault isolation and diagnostics.

All the above are checks of the electrical circuitry, connections, scrambling algorithms, and payload integrity up to the E/O conversion point. As mentioned previously, the physical layer optics may be monitored by laser bias threshold alarm and optical transmit power threshold alarm. These threshold crossing alerts, just as the PM failures described above, can initiate maintenance/diagnostic actions leading to recovery actions (i.e, rerouting traffic to an alternate port and/or shutting down the laser) and fault isolation. Once the electrical looped-back signal is known to be acceptable and the optic output known to be acceptable, the outgoing signal on the line 56 is guaranteed to be of high integrity.

Figure 4:
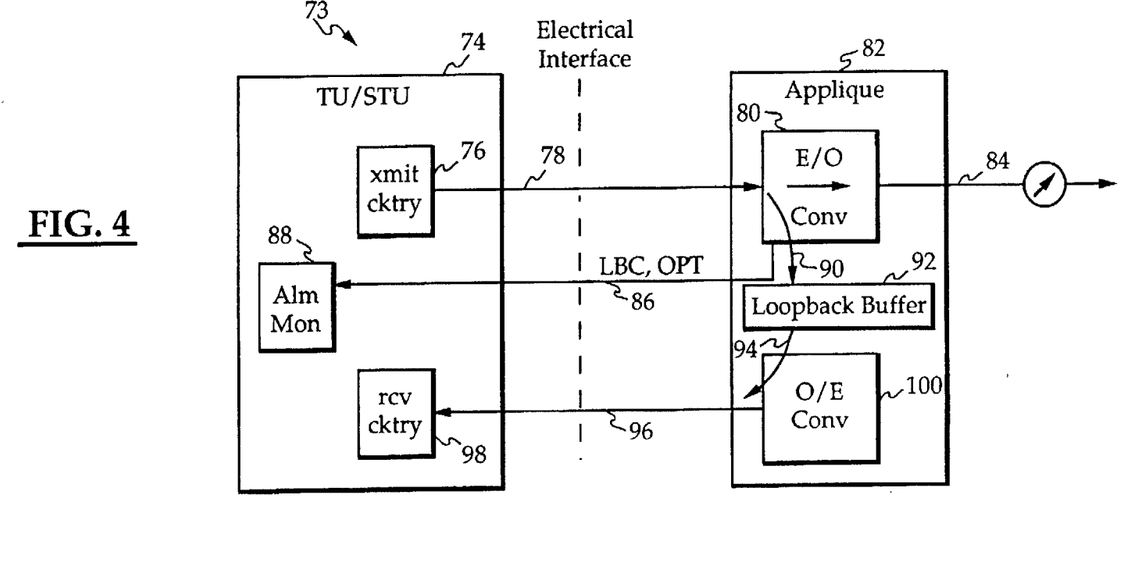
FIG. 4 illustrates an integrated unidirectional port configuration, according to the present invention.

The bidirectional port 10 of FIG. 1 is currently implemented in an Alcatel A1000AX ATM Virtual Path (Service Platform) product. It is embodied with alarm monitoring, transmit and receive circuitry in a TU/STU module, and the electrical/optical module and optical/electrical converters on another module called an "applique". It is possible to modify the applique module, according to the present invention, as shown in FIG. 4, to provide a port 73 for unidirectional operation as a transmit port only as a feature thereof. Such a solution would be implemented as shown in FIG. 4 with the same approach as suggested in FIG. 3, except keeping the O/E converter in place on the present applique module and also keeping the receive circuitry intact for interpreting the looped-back signal as modified, as explained above, i.e., for interpretation as a looped-back signal rather than a received signal from another node. In this way, the TU/STU and applique modules do not have to be changed much, except for some minor software changes. Moreover, using this approach, the port 73 may be provisionable as either bidirectional or unidirectional. In the unidirectional mode, full datastream loopback would be invoked in the applique module. In doing so, full performance monitoring, e.g., of an STS-3c signal (SONET overhead and ATM layer performance monitoring) can be performed on the looped-back signal which, in this case, is the transmitted signal. Once performance monitoring is performed, the looped-back signal is discarded, as it has no other network destination.

A modified TU/STU module 74 includes transmit circuitry 76 for providing an electrical output signal 78 to an electrical-to-optical converter 80, which forms part of a modified applique module 82 for providing an optical output signal on a line 84. The laser bias current and optical power of the laser are monitored by sensed signals on a line 86 by an alarm monitor 88. As before, the electrical signal on the line 78 is looped back, as indicated by a signal line 90 on a continual basis, and may be stored in a loopback buffer 92 before being provided on a line 94 on a signal line 96 to receive circuitry 98 for monitoring and evaluation, as previously described. The modified applique may have the O/E converter removed, for cost reasons, if "transmit-only" unidirectional ports are preferred.

As in the port of FIG. 3, the operating software can be modified such that recognition of a performance monitoring fault on the unidirectionally provisioned port is associated with the transmit port. LOS, LOF and LOP are recognized as failures, while BIP errors in the monitored SONET overhead "B" bytes are detected and reported but appropriate FEBE bits are suppressed. If the downstream node ignores FEBE, these FEBE bits (sent in the Z2 and G1 bytes) could optionally be sent and detected on the looped-back signal, allowing another level of performance monitoring. Due to the lack of a received optical signal on unidirectional transmit ports, OPR (optical receive power) monitoring from any existing (if present) O/E converter 100 should be masked.

As suggested above, the receive port could be provisionable as either bidirectional or unidirectional (or separate bi- and uni-directional ports can be accommodated). In the unidirectional mode, normal performance monitoring is performed on the "received" signal, with normal fault and anomaly reporting in effect. Applique-generated OPT and LBC alarms should be masked, as they are not relevant in this application. Since no return (transmit) fiber exists on the unidirectional receive port, normal far-end performance monitoring information (i.e., FEBE, RDI indications) cannot be returned to the source (i.e., VIP).

If network synchronization is required, it must be assumed that the connecting equipment (i.e., VIP) has stratum clock traceability from a separate source, or from a bidirectional port from the ATM service platform from which network synchronization can be obtained. The Alcatel A1000X internal switching fabric connections are point-to-point bidirectional or multipoint unidirectional. If point-to-point bidirectional internal connections are used to establish connections between unidirectional ports (service in one direction, low data rate maintenance cells in return direction), failures detected on the looped-back transmit port may provide a VP/AIS ATM layer message, which should be masked by the receiving unidirectional port. If multiport unidirectional switched connections are used, the generation of an "unknown VPI" threshold alarm message (due to no return VPI being expected) in the transmit port should be masked upon port provisioning.

Figure 5:
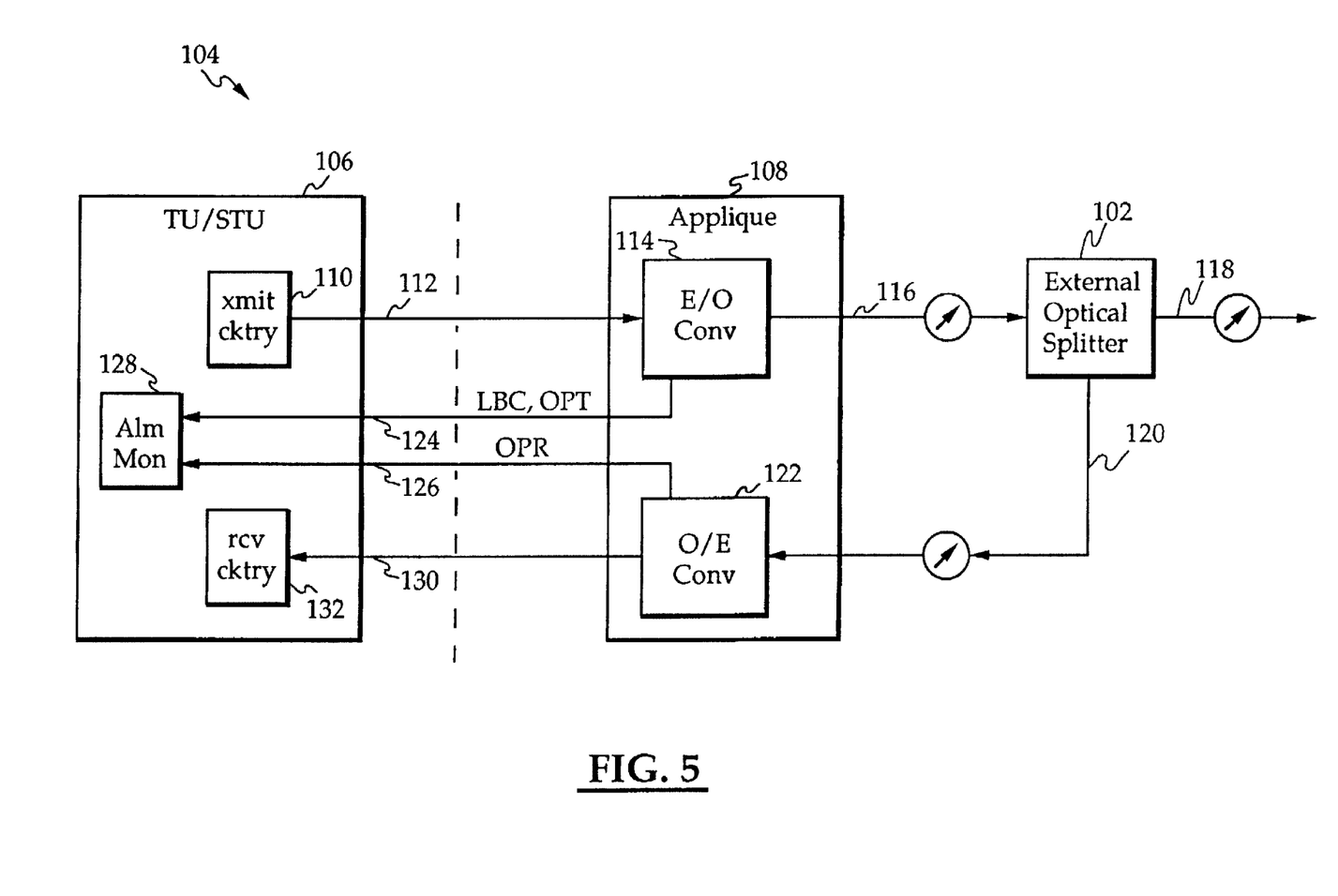
FIG. 5 shows the use of an optical splitter, according to the present invention.

FIG. 5 shows the use of an external optical splitter 102 rather than the applique loopback mechanism discussed in connection with FIG. 4. The port 104 shown in FIG. 5 includes a TU/STU module 106 and an applique 108. The TU/STU module 106 includes transmit circuitry 110 for providing an electrical signal on a line 112 to an electrical-to-optical converter 114, which in turn provides an optical output signal on a line 116 to the optical splitter 102. The splitter provides the signal on the line 116 as two signals, i.e., a downstream signal on a line 118 and a looped-back signal on a line 120 to an optical-to-electrical converter 122 in the applique 108. Both the electrical-to-optical converter 114 and the optical-to-electrical converter 122 provide sensed laser bias current signals and optical power level signals on signal lines 124, 126 respectively, to an alarm monitor 128. The optical-to-electrical converter 122 sends an electrical signal equivalent to the optical signal on the line 120 to receive circuitry 132 in the TU/STU module 106.

The mechanisms of FIGS. 4 and 5 are roughly equivalent for fault scenarios but have the following differences:

(1) the splitter mechanism introduces one additional serial component, therefore another source of failure or reduced reliability, (2) it truly does have access to the optical output of the applique for optical feedback purposes (a possible advantage), (3) it reduces the signal power received by the network node 11b (assuming passive splitting), (4) it would require optical receive power monitoring in the applique (although the threshold may have to be reduced when "transmit only" is optioned, (5) it requires a receive fiber, (6) it is more expensive to implement, and (7) it is more cumbersome to change over from "transmit only" service to full bidirectional service.

Figure 6:
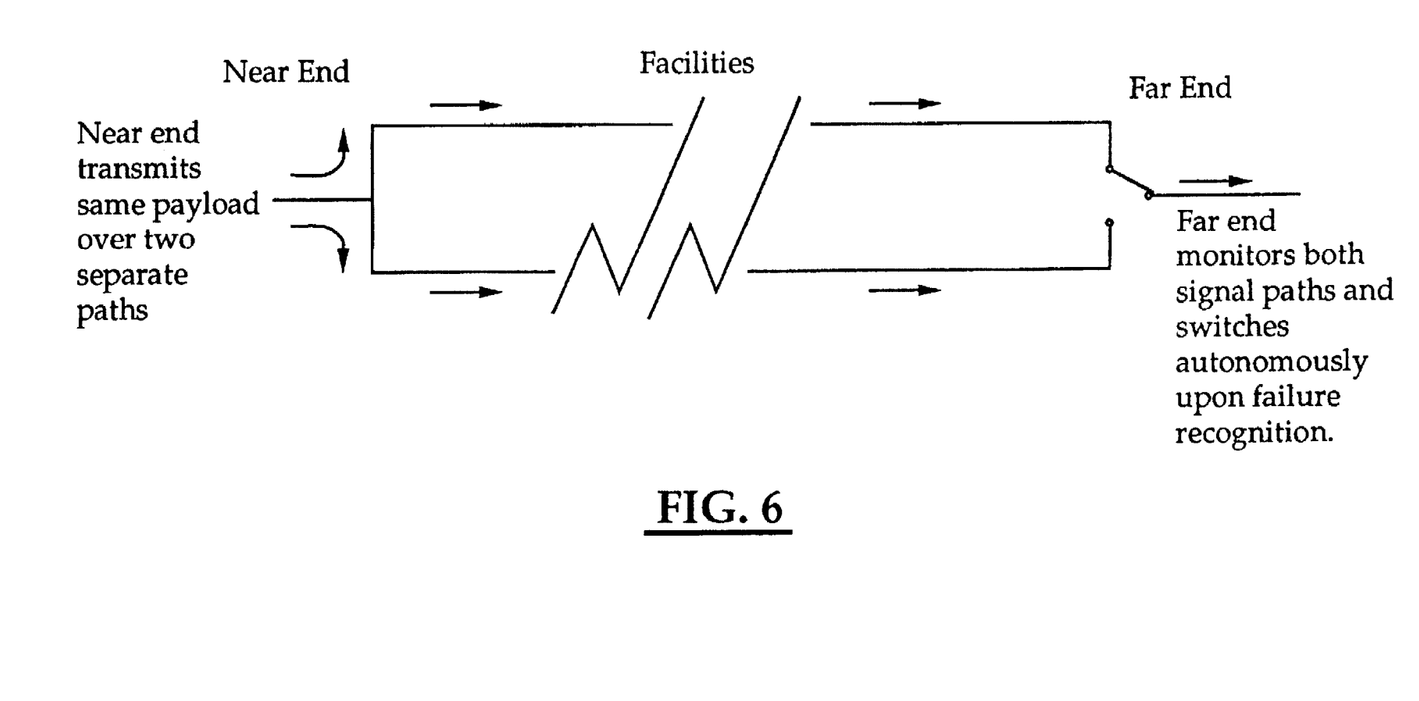
FIG. 6 shows a simple sketch of a one-plus-one unidirectional switching mechanism for implementing automatic protection switching for a unidirectional video distribution system.

FIG. 6 shows a simple sketch of a one-plus-one unidirectional switching mechanism for implementing automatic protection switching for a unidirectional video distribution system, such as described above. The configuration shown in FIG. 6 uses redundant facilities with an active signal being transmitted at the near end on both paths. The far-end equipment receiving the signal monitors both paths, and upon recognition of a failure, autonomously switches to the protection line if performance monitoring overhead data on this path shows it to be of higher integrity than the other or failed path. Since this switching is always done at the receiving end, transmit-only broadcasts to customer premises equipment (CPE) can be accomplished by multicasting to two ports (active and one-plus-one protection line), with the switchover being the responsibility of the CPE or terminating equipment. This fault recovery mechanism will meet the 50 ms switchover criteria of Bellcore Technical Reference TR-NWT-000253. The addition of this feature adds robustness to the video distribution network described above. With the same video distribution signal simultaneously broadcast on two separate fibers, i.e., two separate TUs/appliques, the receiving end makes the switchover decision. Both of the redundant ports would be "transmit-only" (with loopback) as described previously. Any failure would cause the APS mechanism in the far-end unit to initiate the switchover. If the problem was in the near-end equipment, for example, the performance monitoring mechanisms acting on the loopback would allow for trouble isolation and repair, with service being unaffected. If the problem was in the fiber plant, or the far-end equipment receive circuitry, the APS mechanism of the far-end equipment would still operate, with the near-end performance monitoring mechanism once again aiding in fault isolation. The main point here is, that in a one-plus-one unidirectional APS scheme such as this, if a fiber break or optical connector misalignment failure occurs, not only does the near-end equipment not "know", but it also does not matter to it. The near-end equipment has no recovery responsibility, yet the network is robust. In the scenario where a fiber break or optical connector misalignment has occurred, since the near-end equipment has no indication of a fault occurring, and the network is completely dependent upon fault recognition by the far-end equipment of FIG. 6, in this case, the far-end equipment must autonomously initiate recovery procedures (i.e., protection switching to an alternate fiber) and report alarm status via the mechanism at its disposal, (i.e., independent control link, E2A telemetry system, OS interface, etc.).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Method for providing a video distribution signal (12) from one network node (11a) to another network node (11b) in a network according to a standard digital communications format (ATM; SONET; DS3) that defines digital signal communications in a bidirectional manner between nodes in said network with equal bandwidth for digital signals in each direction, comprising the steps of:

providing said video distribution signal (56) from said one network node to said another network node without providing said digital signal communications in said bidirectional manner; and monitoring (66) said video distribution signal in said one network node for providing a performance monitoring function and for providing a status signal (68) indicative thereof wherein said performance monitoring function and said status signal are indicative only of performance of said one network node and wherein said another network node performs its own performance monitoring and communicates its performance in said network other than in said bidirectional manner between said one network node and said another network node.

2. Apparatus for providing a video distribution signal (12) from one network node (11a) to another network node (11b) in a network according to a standard digital communications format (ATM; SONET; DS3) that defines digital signal communications in a bidirectional manner between nodes in said network with equal bandwidth for digital signals in each direction, comprising:

means for providing said video distribution signal (56) from said one network node to said another network node without providing said digital signal communications in said bidirectional manner; and means for monitoring (66) said video distribution signal in said one network node for providing a performance monitoring function and for providing a status signal (68) indicative thereof wherein said performance monitoring function and said status signal are indicative only of performance of said one network node and wherein said another network node performs its own performance monitoring and communicates its performance within the network other than in said bidirectional manner between said one network node and said another network node.

* * * * *

UNITED STATES PATENT AND TRADEMARK OFFICE
CERTIFICATE OF CORRECTION

PATENT NO. : 5,640,512
DATED     : June 17, 1997
INVENTOR(S) : R. Czerwiec

It is certified that error appears in the above-indentified patent and that said Letters Patent is hereby corrected as shown below:

```
At column 2, line 65, please cancel "155,520 Mbit/s"
and substitute therefor --155.520 Mbit/s--.
```

Signed and Sealed this

Twenty-third Day of September, 1997

Attest:

BRUCE LEHMAN

Attesting Officer

Commissioner of Patents and Trademarks